E. RIVETT.
BOTTOMING DEVICE FOR LATHE CHUCKS.
APPLICATION FILED FEB. 27, 1911.
1,014,773.
Patented Jan. 16, 1912.
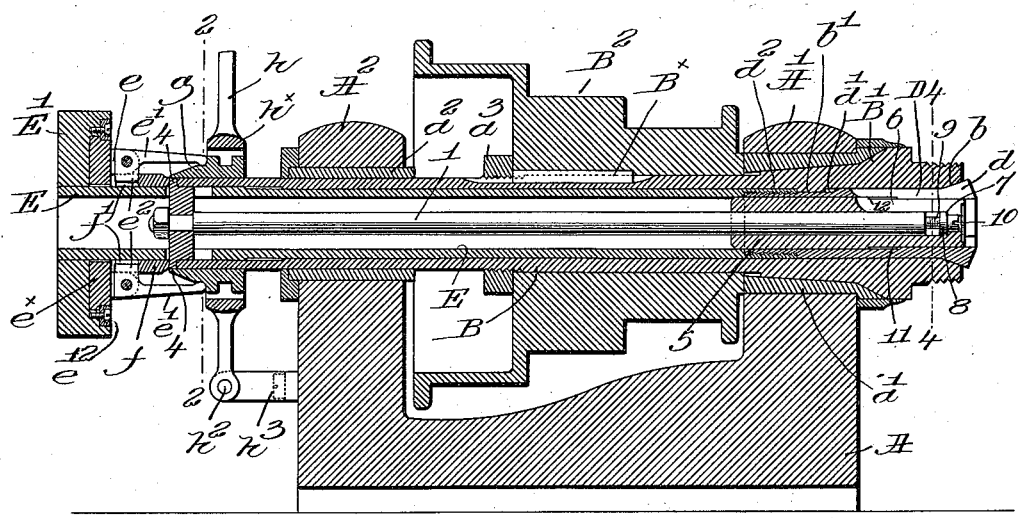
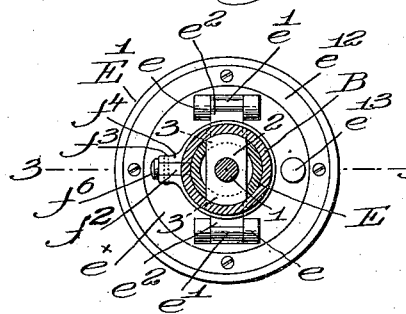
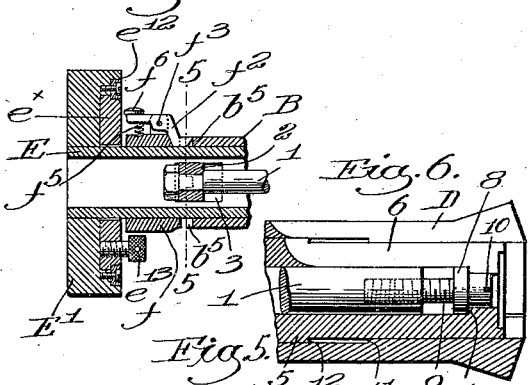
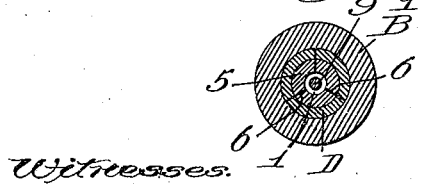
Witnesses.
Thomas J. Drummond
Fred. S. Greenleaf
Inventor.
Edward Rivett
by Edwards, Heard & Smith
Att'ys.

UNITED STATES PATENT OFFICE.

EDWARD RIVETT, OF BRIGHTON, MASSACHUSETTS.

BOTTOMING DEVICE FOR LATHE-CHUCKS.

1,014,773. Specification of Letters Patent. Patented Jan. 16, 1912.

Application filed February 27, 1911. Serial No. 611,194.

*To all whom it may concern:*

Be it known that I, EDWARD RIVETT, a citizen of the United States, and resident of Brighton, county of Suffolk, State of Massachusetts, have invented an Improvement in Bottoming Devices for Lathe-Chucks, of which the following description, in connection with the accompanying drawing, is a specification, like characters on the drawing representing like parts.

This invention has for its object the production of novel and efficient means for bottoming accurately and with great exactness a tool or other object when clamped in a lathe chuck, so that when the chuck is unclamped or open the object to be clamped therein can be inserted to the precise depth desired, the closing or clamping of the chuck making no change in the point at which the object is bottomed.

When working on a number of similar objects requiring the same treatment it is of the greatest importance that each one shall be bottomed in the chuck to the same extent, and heretofore, so far as I am aware, this has depended very largely upon the skill of the operator, for when the chuck is clamped by the drawing-in spindle there is almost always a tendency to change the axial position of the object in the chuck. By my invention, when the bottoming device has once been set or adjusted for a given effective depth of the chuck, the objects to be operated upon can be rapidly and quickly inserted one after another in the chuck, with the certainty that when the chuck is clamped every one of such objects will be bottomed at exactly the same point.

The various novel features of my invention will be fully described in the subjoined specification and particularly pointed out in the following claims.

Figure 1 is a central longitudinal section of a lathe head-stock and appurtenances, substantially as shown in my Patent No. 545,312, granted to me August 27, 1895, with one embodiment of my present invention applied thereto; Fig. 2 is a transverse sectional view on the line 2—2, Fig. 1, looking toward the left; Fig. 3 is a longitudinal, horizontal section of a portion of the mechanism, taken on the line 3—3, Fig. 2; Fig. 4 is a transverse section through the chuck-spindle and chuck on the line 4—4, Fig. 1; Fig. 5 is a similar view on the line 5—5, Fig. 3, looking toward the right, but with certain parts in elevation, to be again referred to; Fig. 6 is an enlarged detail of the chuck and the bottoming member, and the adjusting means for the latter, shown in Fig. 1.

The head-stock A having bearings A′, A² and bushings $a'$, $a^2$ therein, the tubular chuck-spindle B rotatably mounted in the bushings, the cone-pulley B² secured to the chuck-spindle by a key B$^\times$ and nut $a^3$, preventing, in connection with the tapered forward end B′ of the chuck-spindle, longitudinal movement of the latter; the slitted expansible chuck D having the usual tapering outer end $d$ to fit in a correspondingly shaped recess $b$ in the forward end of the chuck-spindle B; and the externally threaded inner end $d^2$ of the chuck to be engaged by the interiorly threaded end of the tubular drawing-in spindle E, journaled in the chuck-spindle B, to regulate the effective opening of the chuck, may be and are all substantially as in my patent except in such particulars as will be hereinafter referred to. Rotation of the chuck in the chuck-spindle is prevented by a stop-lug $b'$ on the latter projecting into a longitudinal groove $d'$ in the chuck. Rotation of the drawing-in spindle E to change the effective opening of the chuck is accomplished by a hand-wheel E′ secured to the rear end of the spindle, practically as in my prior patent. The hand-wheel is recessed on its inner face to receive the disk-like hub $e^\times$ held in the wheel by a retaining ring $e^{12}$ and ordinarily clamped to the wheel by a clamp-screw $e^{13}$, Figs. 2 and 3.

A collar $f$ having slots $f'$ surrounds the drawing-in spindle between the hub $e^\times$ and the adjacent rear end of the chuck-spindle, and ears $e$ on said hub have pivoted thereto levers $e'$ provided with inturned toes $e^2$ which enter and bear against the ends of the slots $f'$ in the collar $f$, substantially as in my patent. Said levers are controlled by an annularly-grooved cone-sleeve $g$ governed as to its position by projections (not shown) on a yoke $h^\times$ forming part of the operating lever $h$ fulcrumed at $h^2$ on a bracket $h^3$, Fig. 1, on the head-stock. Movement of the cone-sleeve $g$ to the right, Fig. 1, releases the levers $e'$ and the chuck, but when said sleeve is in the position shown the levers are spread and their toes $e^2$, bearing on the ends of the slots $f'$, force the drawing-in spindle to the left, Fig. 1, drawing in the chuck D and clamping it, the collar $f$ at such time being held from movement to the right.

I will briefly describe the means for locking the collar $f$ to the chuck-spindle, to prevent alteration of the chuck adjustment by rotation of the drawing-in spindle within the chuck-spindle.

The rear end of the chuck-spindle has a series of notches $b^5$, see Fig. 5, any one of which can be entered by a locking latch $f^2$ pivoted at $f^3$, Figs. 2 and 3, between ears $f^4$ on the collar $f$, a spring $f^5$ holding the latch in its operative position. By depressing a finger-piece $f^6$ the latch is lifted and then the drawing-in spindle can be revolved by the hand-wheel to change the effective opening of the chuck, the clamp-screw $e^{13}$ being loosened when such adjustment is being made, and when completed the latch is released and enters a notch $b^5$.

The bottoming device now to be described, must always maintain a fixed position axially with relation to the chuck-spindle, in order that when the object is held in the chuck it shall be definitely bottomed, and without any possibility of axial movement due to the clamping movement of the chuck. To this end I have mounted a supporting spindle 1 within the chuck and drawing-in spindle, co-axial therewith, the rear end of said spindle 1 being fixedly held in a transverse cross-head 2 extended freely through diametrically opposite, elongated slots 3 in the drawing-in spindle E and fitting snugly into the adjacent rear end of the chuck-spindle B. Segmental lips 4 on the ends of the cross-head are interposed between the rear end of the chuck-spindle and the collar $f$, as shown in Fig. 1, so that when the chuck is drawn in by the proper movement of the cone-sleeve $g$ said chuck-spindle and the lips 4 serve as an abutment for the collar $f$, the cone-sleeve sliding over the outer edges of the lips, and the cross-head is also held from any axial movement.

The bottoming member is herein shown as an elongated sleeve 5, Fig. 1, fitted slidably in the chuck and also slidably mounted on the front end of its supporting spindle 1, the forward end of the member 5 being longitudinally slitted, as at 6, to permit compression by the chuck when the latter is clamped on the object therein. At its front end the bore of the bottoming member 5 is internally and annularly shouldered at 7, Fig. 1, to engage an annular enlargement 8 on the head of an adjustable connecting stud 9, which is threaded and screwed into a threaded hole in the spindle 1, the nicked head 10 of the screw being sunk below the outer end of the bottoming member 5.

From the foregoing it will be manifest that the forward end of the supporting spindle 1 is always fixed with relation to the chuck-spindle B, but by turning the connecting stud 9 in or out its annular enlargement 8 will be moved toward or from the end of the spindle 1, and consequently the outer end of the bottomer 5 can be pushed inward or it will be moved outward, to adjust the effective depth of the chuck. The work or other object inserted in the chuck is thus accurately bottomed therein by engagement with the outer end of the member 5, and axial movement of the object into the chuck cannot be any farther than is permitted by said member when its shoulder 7 seats upon the enlargement 8 of the adjustable connection 9. The interior of the chuck is bored to leave a small shoulder 11, which is opposed to an external shoulder 12 on the bottoming member, this construction preventing any accidental withdrawal of said member from the chuck.

As will be apparent from Fig. 1 the slots 3 in the drawing-in spindle E permit the longitudinal movement thereof when clamping and unclamping the clutch without interference from the cross-head 2, and said slots also permit the adjustment of the clutch opening by rotation of the drawing-in spindle without altering the axial position of said cross-head relatively to the chuck-spindle.

I have not herein provided for any longitudinal change in the position of the supporting spindle 1 to effect the axial adjustment of the bottoming member 5, for that would be somewhat inconvenient for the attendant when setting up or adjusting, but by providing for adjustment near the front end of the chuck-spindle, within the chuck itself, the attendant can test the adjustment readily and quickly from time to time until the bottoming member is set with absolute exactitude for the particular work to be performed.

While I have herein shown one practical embodiment of my invention, in the form preferred by me, various changes or modifications in details of construction and arrangement may be made by those skilled in the art without departing from the spirit and scope of my invention as set forth in the claims hereunto annexed.

Having fully described my invention, what I claim as new and desire to secure by Letters Patent is:

1. The combination with a tubular chuck-spindle, a drawing-in spindle therein, a connected chuck, and means coöperating with the drawing-in spindle to effect longitudinal movement of the chuck and thereby clamp and unclamp the chuck, of a bottoming member within the chuck to determine the axial position of an object inserted in the chuck, and means permanently held from axial movement to support said member and maintain it fixedly positioned with relation to longitudinal movement of the chuck for clamping.

2. The combination with a tubular chuck-spindle, a drawing-in spindle therein, a connected chuck, and means coöperating with the drawing-in spindle to effect relative longitudinal movement of the chuck and chuck-spindle and thereby clamp and unclamp the chuck, of a bottoming member within the chuck to determine the axial position of an object inserted in the chuck, and means fixedly connected with the chuck-spindle to support the bottoming member within the chuck and prevent axial movement of said member when the chuck is clamped.

3. The combination with a chuck-spindle, a chuck therein, and means to effect relative longitudinal movement of the chuck-spindle and chuck, to thereby clamp and unclamp the chuck, of bottoming means including a positioning member located within said chuck and supported independently thereof, and a device connected with said member and held from axial movement relatively to the chuck.

4. The combination with a chuck-spindle, a chuck therein, and means to clamp and unclamp the chuck, of bottoming means, including a tubular positioning member axially movable within the chuck, a support for said member, independent of the chuck and extended loosely into the positioning member, and a device to coöperate with said member and the adjacent end of its support and adjust the position of the former axially of the chuck.

5. The combination with a tubular chuck-spindle, a drawing-in spindle therein, a connected chuck, and means coöperating with the drawing-in spindle to clamp and unclamp the chuck, of a bottoming member within the chuck to determine the axial position of an object inserted in the chuck, a supporting spindle co-axial with the drawing-in spindle and fixedly held by the chuck-spindle, the bottoming member loosely embracing the supporting spindle, and an adjustable connection between said spindle and the bottoming member to determine the axial position of the latter with relation to the chuck.

6. The combination with a tubular chuck-spindle, a tubular, longitudinally slotted drawing-in spindle journaled therein, a chuck connected with and adjusted by rotation of the drawing-in spindle, and means coöperating with the drawing-in spindle to clamp and unclamp the chuck, of a cross-head extended through the slots of the drawing-in spindle and fixed in the adjacent part of the chuck-spindle, a supporting spindle fixedly attached to the cross-head and extended through the drawing-in spindle into the chuck co-axially, a bottoming member slidable on the supporting spindle within the chuck, and an adjustable connection between such spindle and the bottoming member, to determine the position of the latter longitudinally of the chuck and thereby fix the depth to which an object can be inserted in said chuck.

7. A tubular chuck-spindle, a hollow, longitudinally slotted drawing-in spindle journaled therein, a chuck adjusted by rotation of the drawing-in spindle, a collar on and rotatable with such spindle adjacent the rear end of the chuck-spindle, means to lock the collar and chuck-spindle together, and means coöperating with the drawing-in spindle to clamp and unclamp the chuck, combined with a bottoming member within the chuck, a supporting spindle for and upon which the bottoming member is longitudinally adjustable, and a cross-head fixedly attached to the rear end of the supporting spindle and extended through the slots of the drawing-in spindle to engage the adjacent portion of the chuck-spindle, said cross-head having lips interposed between the rear end of the chuck-spindle and the collar, to fixedly position the cross-head and supporting spindle and prevent longitudinal movement thereof.

8. The combination with a tubular chuck-spindle, an expansible chuck therein, and means, including a drawing-in spindle journaled in said chuck-spindle, to move the chuck longitudinally in the latter, to clamp and unclamp the chuck, of an expansible bottoming member supported within the chuck and adjustable longitudinally thereof, manually controlled means to adjust the bottoming member longitudinally within the chuck and thereby determine the effective depth of the chuck, and a support on which said manually controlled means is mounted, said support being permanently held from axial movement relatively to the chuck.

In testimony whereof, I have signed my name to this specification, in the presence of two subscribing witnesses.

EDWARD RIVETT.

Witnesses:
JOHN C. EDWARDS,
THOMAS J. DRUMMOND.

Copies of this patent may be obtained for five cents each, by addressing the "Commissioner of Patents, Washington, D. C."